United States Patent [19]

Nakayama et al.

[11] Patent Number: 4,571,042
[45] Date of Patent: Feb. 18, 1986

[54] DISK FILM PROJECTOR

[75] Inventors: Yoshiaki Nakayama; Takao Kiuchi, both of Tokyo, Japan

[73] Assignee: Fuji Photo Film Co., Ltd., Kanagawa, Japan

[21] Appl. No.: 644,952

[22] Filed: Aug. 28, 1984

[30] Foreign Application Priority Data

Aug. 29, 1983 [JP] Japan ................................ 58-156338

[51] Int. Cl.⁴ .............................................. G03B 23/10
[52] U.S. Cl. .................................................... 353/110
[58] Field of Search ................ 353/110, 108, 109, 19, 353/120, 121, 122; 40/362, 366, 367

[56] References Cited

U.S. PATENT DOCUMENTS 4,396,282  8/1983  Anderson ........................ 353/110 X
4,473,280  9/1984  Staar ............................... 353/120 X Primary Examiner—Harry N. Haroian
Attorney, Agent, or Firm—Birch, Stewart, Kolasch & Birch

[57] ABSTRACT

In a disk film projector, desired one of frames of image recorded on a rotary disk of film having a central engaging core is placed at a projecting position for selective reproduction of images recorded in the frames. There is provided a drive unit including a rotary driving shaft having its forward end engageable with the engaging core of the disk film. The rotary disk is held in a plane substantially normal to the rotary driving shaft upon insertion of the rotary disk in position within the projector. The disk film is introduced into, and taken out of, the projector only in a direction substantially normal to the rotary driving shaft. The driving shaft is normally urged in a direction such that the driving shaft is brought into engagement with the engaging core of the rotary disk held in the aforementioned manner. The rotary driving member is locked at a position spaced from the rotary disk when the rotary driving shaft is manually shifted against the urging member and away from the rotary disk.

3 Claims, 6 Drawing Figures

DISK FILM PROJECTOR

BACKGROUND OF THE INVENTION

1. Field of the Invention

This invention relates to a disk film projector, and more particularly, to a disk film projector which reproduces an image recorded on a rotary disk of film into a visual image.

2. Description of the Prior Art

There is known in the art a photosensitive film in the form of a rotary disk, or a so-called disk film, on which still images are mainly recorded.

Recorded images on a disk film may be reproduced in the form of a hard copy or print. There is also a remarkable demand for obtaining a soft copy from a disk film for appreciation. Because of the smaller size of a frame of the disk film, it is necessary to reproduce a frame of image in the form of a soft copy which is enlarged to a size suitable for appreciation. Negative images recorded on the negative type of disk film are required to be reversed into positive images.

These demands may advantageously be satisfied with a technique by which frames of a disk film are shot with a television camera to produce video signals representative thereof, which are in turn used for image reproduction on an image display device such as a CRT, and/or recordation on a recording medium such as a magnetic tape, or magnetic disk, as the case may be.

In order to shoot a frame of a disk film with the television camera, the disk film is loaded into a projector, and unloaded therefrom after shooting. It is highly desirable that such loading and unloading be carried out by a simplified operation with a simplified mechanism used. Usually, the disk has a center core or hub, with which engages a drive shaft of a projector for driving the disk. It is therefore desirable that the core be brought into engagement with, or disengagement from, the drive shaft by a simplified operation when the disk is loaded into, or unloaded from, the projector.

SUMMARY OF THE INVENTION

It is therefore an object of the present invention to provide a disk film projector which is simple in structure, and yet permits a disk film to be loaded and unloaded by a simplified operation.

In accordance with the present invention, a disk film projector, in which one of a plurality of frames of an image recorded on a rotary disk of film having a central engaging part is selectively placed at a projecting position for reproducing selected one of the frames in the form of a visible image, comprises driving means including a rotary drive shaft with a forward part thereof engageable with the engaging part of the disk of film, means for holding the rotary disk in a plane substantially normal to the rotary drive shaft upon insertion of the rotary disk thereinto, the rotary disk being introduced into, and taken out of, the holding means in a direction substantially normal to the rotary drive shaft, means for normally urging the rotary drive shaft in a direction such that the drive shaft is engaged with the engaging part of the rotary disk held by the holding means, and means for locking the rotary drive means at a position spaced from the rotary disk when the rotary drive shaft is, in response to manual operation thereon, shifted against the urging means and away from the rotary disk.

BRIEF DESCRIPTION OF THE DRAWINGS

The above and other objects and features of the present invention will become more apparent from the consideration of the following detailed description taken in conjunction with the accompanying drawings in which.

DESCRIPTION OF THE PREFERRED EMBODIMENT

An embodiment of a disk film projector in accordance with the present invention is hereinafter described with reference to the accompanying drawings.

Figure 1:
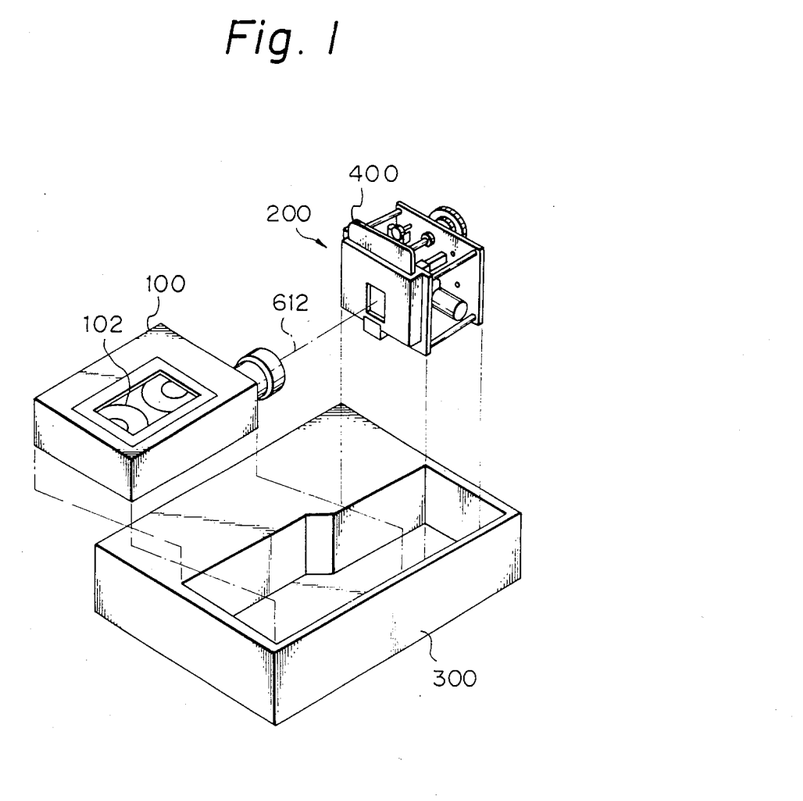
FIG. 1 is an exploded perspective view showing an embodiment of a disk film image reproducing system in accordance with the present invention.

In FIG. 1, there is shown an example of a disk film image reproducing system which includes a television camera 100 having an image pickup tube or a solid-state imaging device, and a disk film projector 200, which are to be installed in a common housing 300, as depicted by the chain-and-dot lines. In the present embodiment, the camera 100 may advantageously be of the type which is so designed as to be detachably loaded with a video tape cassette 102 for magnetic recording of video signals, and is so-called a video tape recorder built-in type television camera. The housing 300 includes image processing circuitry such as a reversing circuit for converting, for example, signals indicative of a negative image into those of a positive image.

A cartridge 400 for reproducing disk film images is removably mounted to the disk film projector 200. As shown in an exploded view of FIG. 2, the cartridge 400 is made up of a pair of generally rectangular, saucer-like housing sections, or halves, 404 and 406 with rounded corners, which sections are connected to each other by a hinge 402 for establishing a protective enclosure for a disk 500.

Figure 2:
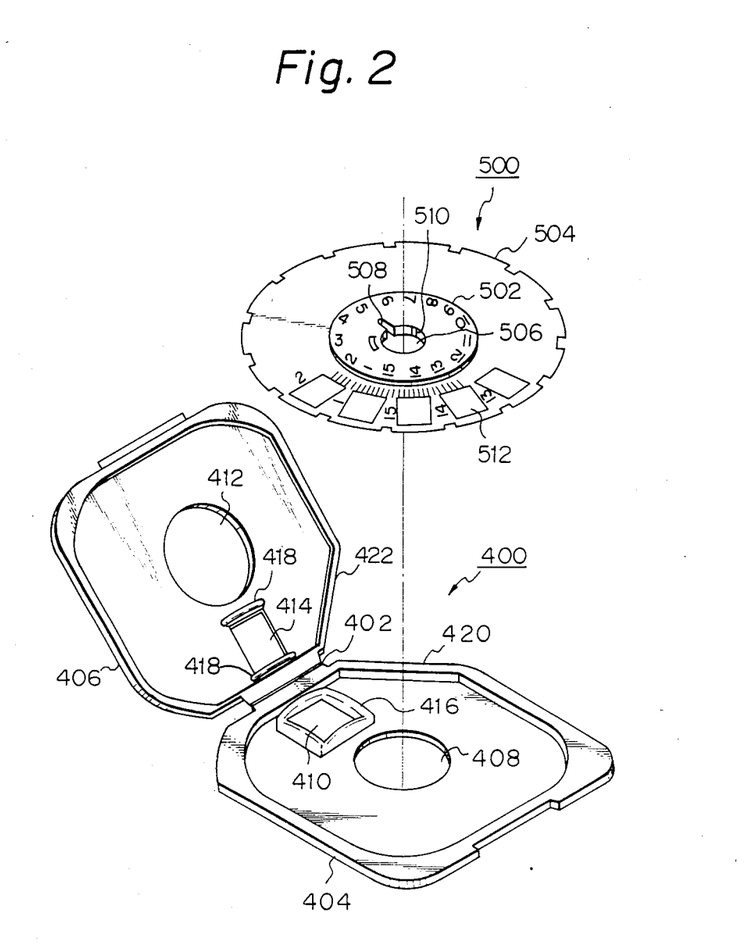
FIG. 2 is an exploded perspective view showing a cartridge for reproduction of a disk film capable of being loaded into a disk film projector shown in FIG. 1.

The disk 500 is made up of a circular core 502, which may be of molded synthetic material, and a disk of photosensitive film 504 supported by the core 502. A generally circular opening 506 is formed at the center of the core 502, and contiguous to a key slot 508 with a plurality of cut-outs 510 formed along on the periphery of the opening 506. In the present embodiment, fifteen rectangular pictures or frames 512 can be recorded on the photosensitive film 504.

The housing shell, or section, 404 has a central circular opening 408 cut in register with the core 502, and a peripheral rectangular opening 410 cut in a portion of the periphery thereof in correspondence in shape to the frame 512. Similarly, the housing shell, or section, 406 has a central circular opening 412 and a peripheral rectangular opening 414.

The housing sections 404 and 406 are thickened along the peripheral rim edges for defining inner recessed portions in which the disk 500 is accommodated. One of the corners of the rectangle of the housing section 404 is formed into a straight edge 420. The corresponding one of the rectangular corners of the other housing section 406 is similarly formed into a straight edge 422. The straight edges 420 and 422, when mating each other, permit the cartridge 400 to be adequately oriented to be loaded into the projector 200. The opening 410 is delimited and surrounded by a projecting rim 416, while the opening 414 is partially delimited by two opposite projecting flanges 418 cooperating with part of the rim 416 for defining a reference level of plane, in which a frame 512 of the film 504 is involved when loaded at a projecting position of the projector 200.

Referring now to FIGS. 3 to 6, the disk film projector 200 has two flat plates 202, 204 connected to each other by supporting members 206. A cartridge holder 208 for holding the cartridge 400 is supported by supporting members 210. The cartridge 400 may be enclosed within a recess 212 defined by the cartridge holder 208.

Figure 3:
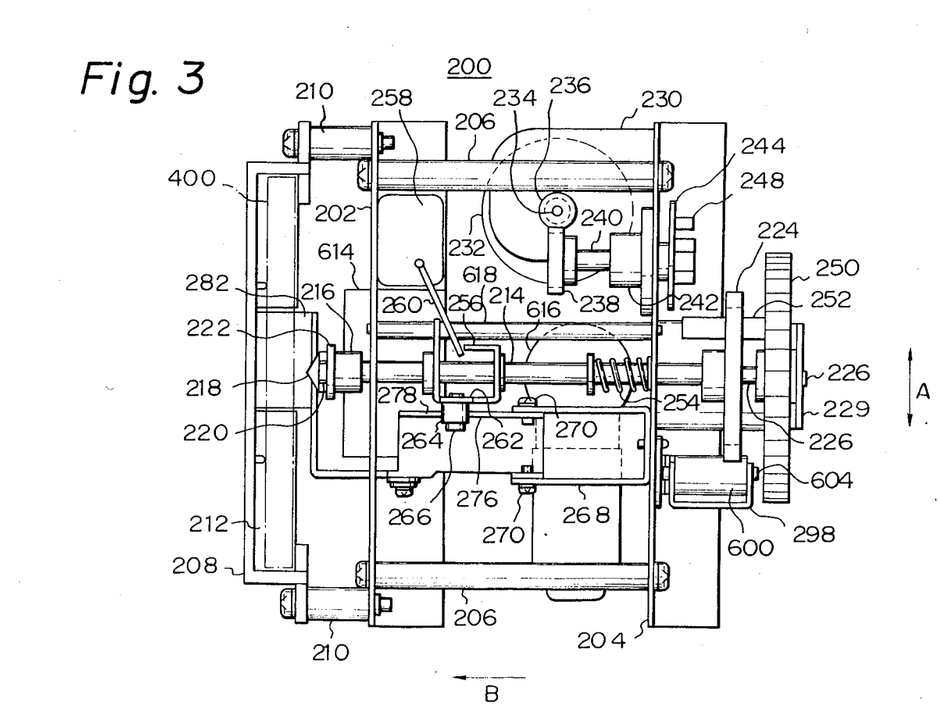
FIG. 3 is a top plan view of the disk film projector shown in FIG. 1.
Figure 4:
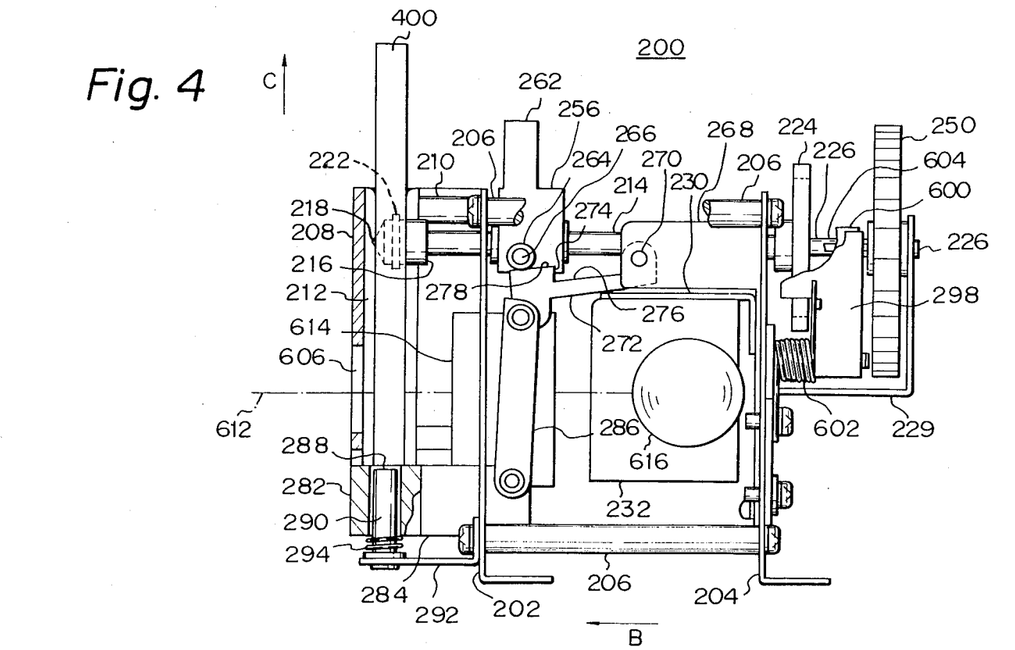
FIG. 4 is a partially taken out, bottom view showing the projector shown in FIG. 3, with a disk cartridge loaded in position.

A spindle 214 is supported within central circular holes of the flat plates 202 and 204 for rotation about its axis. The spindle position is in register with the position of the opening 506 of the circular core 502 when the cartridge 400 enclosing the disk 500 is inserted completely into its loading position within the recess 212.

To one end of the spindle 214 is fastened an end piece 216 having its tip 218 projecting with a gradient and profiled for engaging with the opening 506 of the circular core 502. The end piece 216 is generally cylindrical and provided with a plurality of peripheral lugs 220, which are engageable with peripheral cut-outs 510 of the opening 506. The end piece 216 is also provided with an annular flange 222 larger in diameter than the opening 506 so that it would not be thrusted past the opening 506.

A gear 224 is fixed to the other tubular end of the spindle 214. A supporting member 226 in the form of a shaft is slidably mounted in the hollow interior of the spindle, and secured to an L-shaped supporting member 229 which is secured in turn to the flat plate 204. Hence, the spindle 214 is telescopically supported within the supporting member 226.

Figure 5:
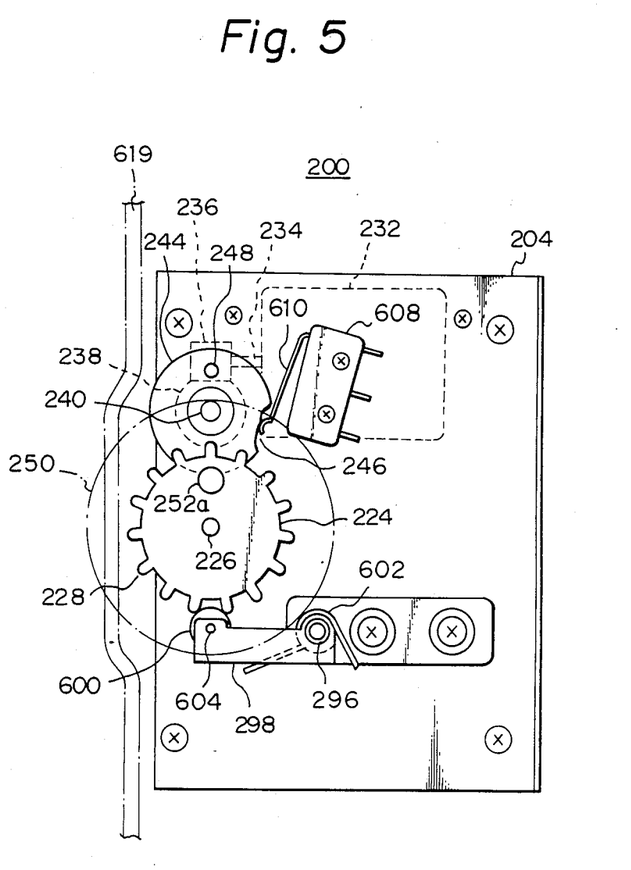
FIG. 5 is a right-hand side view showing the projector of FIG. 3.

As shown in FIG. 5, the gear 224 has fifteen teeth 228, in this instance. An electrical motor 232 is supported on the flat plate 204 by an L-shaped supporting member 230. The electric motor 232 may preferably be a d.c. motor provided with a drive, or output, shaft 234 mounted with a worm 236. The latter is engaged with a worm wheel 238 secured to one end of a shaft 240.

The shaft 240 is rotatably supported by a support member 242 secured to the flat plate 204. The shaft 240 has a cam 244 secured to the other end thereof. The cam 244 has a peripheral cut-out 246, as clearly shown in FIG. 5 again. The flat plate 204 carries a limit switch 608, as shown in FIG. 5. The limit switch 608 has a movable arm 610 the foremost part of which slides on the periphery of the cam 244 so as to descend into the cut-out 246 as the cam 244 rotates. The limit switch 608 is responsive to such descent of the movable arm 610.

The cam 244 also has a cylindrical boss 248, as shown in FIG. 3. As described below, the gear 224 can selectively assume either the position shown in FIG. 3 or the position shown in FIG. 4 in the longitudinal direction of shaft 214. The boss 248 has a length such that the boss 248 is engaged with the recess between two neighboring teeth 228 of the gear 224, when the gear assumes the position shown in FIG. 3. In other words, the shafts 214 and 240 are positioned relative to each other so that, when the cam 244 is driven in rotation about shaft 240, the boss 248 will be brought into the recess between two neighboring teeth 228 of the gear 224 to abut on one of the teeth 228 to drive the gear 224 to rotate. Thus, when the motor 232 is energized into operation, the cam 244 is turned for causing the gear 224, and hence the spindle 214, to rotate together.

It should be noted that a rotary plate 250 in the form of a disk is rotatably supported by the support member 226. The rotary plate 250 has a stud 252 secured at its one end, and the other end of the stud 252 is freely passed through an opening 252a in the gear 224. The gear 224 may selectively take the positions shown in FIGS. 3 and 4, as discussed hereinafter. The stud 252 is of a length such that it may be engaged with the opening 252a regardless of the positions occasionally assumed by the gear. Hence, manual driving in rotation of the rotary plate 250 in the direction of the arrow A will cause the gear 224, and hence the spindle 214 associated therewith, to be rotated.

The spindle 214 is biased in the direction of the arrow B by a coil spring 254 retained under compression against the flat plate 204. A manual operating member 256 is mounted to the mid part of the spindle 214 as shown. The main body of the member 256 is generally in the form of a letter C as shown in FIG. 3. The guide member 618 passes through a C-shaped main body of the member 256 carried by the flat plates 202 and 204. With the opened part of the letter C, there is loosely engaged an arm 260 of a limit switch 258 secured to the flat plate 202. Thus the limit switch 258 may be responsive to the movements of the spindle 214 in the directions of the arrow B and opposite thereto.

The upper part of the C-shaped main body of the member 256 has a boss 262 which is associated with an operating knob, not shown, which may be pulled in the direction opposite to the arrow B for shifting the spindle 214 against the force of spring 254. The gear 224 is shifted in response along with the spindle 214 because it is made fast with the spindle 214. The rotary plate 250 is, however, not moved in the direction of the arrow B, since the supporting member 226 is telescopically fitted into the hollow inner part of the spindle 214 so that the spindle is slides freely.

Thus, even when a cover is mounted as indicated partially by a chain-and-dot line 619 in FIG. 5 for closing the housing 300 in its entirety with the rotary member 250 partially exposed through an opening, not shown, of the cover 619 for manipulating the rotary member 250 from outside, the member 250 not shifted in the direction of the arrow B may facilitate the operation thereon from the outside. Additionally, it is sufficient to design the opening corresponding in size to the exposed portion of the rotary member 250. It should be noted that FIGS. 3 and 4 show the situations in which the spindle 214 takes at its right and left side positions, respectively.

The lower part of the main body of member 256 has a roller 264 rollably mounted by a shaft 266. As shown in FIG. 4, the foremost part of a support member 268 secured to the flat plate 204 carries a shaft 270, which has rotatably mounted thereon an arm 272 having an upper portion 274 in the form of a hook, or the letter Z, with a lower side 276 and an elevated side 278 formed. Depending on the positions assumed by the spindle 214, the roller 264 of the member 256 abuts and slides on the lower side 276 or the elevated side 278. Accordingly, when the spindle 214 is at the position shown in FIG. 3, the roller 264 rests on the lower side 276. When the spindle 214 is at the position shown in FIG. 4, the roller 264 rests on the elevated side 278.

Figure 6:
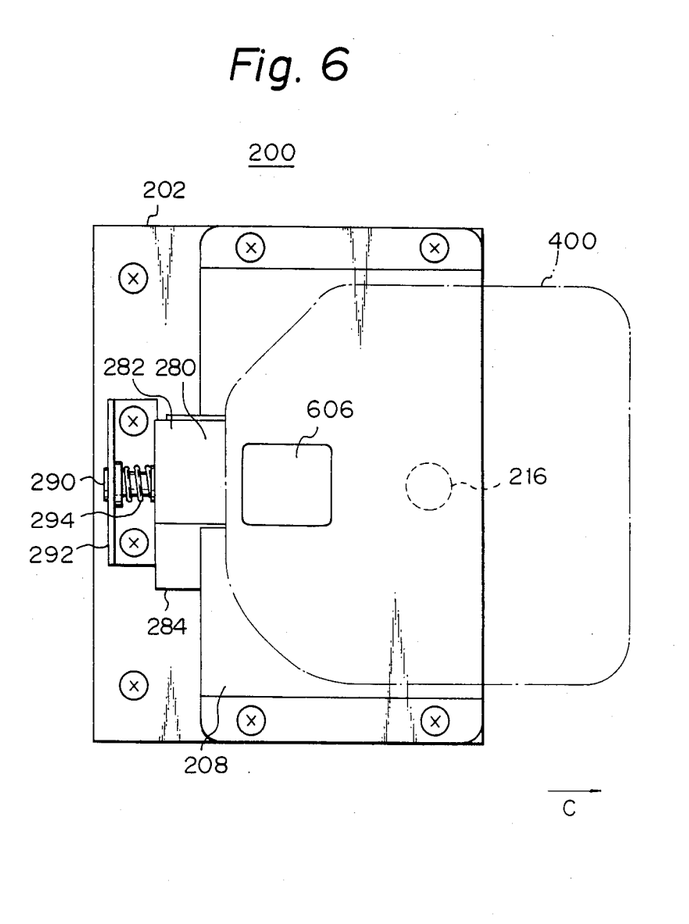
FIG. 6 is similarly a left-hand side view showing the projector of FIG. 3.

It should be noted that, as shown in FIG. 6, the cartridge holder 208 has a rectangular cut-out 280 at the part that is lower in FIG. 4. The cut-out 280 receives part of an abutment member 282. The abutment member 282 is supported by an L-shaped arm 284, which in turn is connected by a link 286 to the arm 272. As shown in FIG. 4, the abutment member 282 has a cylindrical central opening 288 in which a support post 290 is slidably disposed. The post 290 is mounted to the flat plate 202 by an L-shaped arm 292, and associated with a coil spring 294, which is retained under compression by the L-shaped arm 292 and urges the member 282 in the direction of an arrow C.

When the cartridge 400 is inserted into the recess 212 of the cartridge holder 208, the foremost part of the cartridge 400 abuts on the upper surface of the abutment member 282. When the cartridge 400 is pressed down further manually in the direction opposite to the arrow C, the abutment member 282 is lowered against the expanding force of the spring 294. The arm 284 and the link 286 are lowered correspondingly, so that the arm 272 is turned about shaft 270 counterclockwise in FIG. 4. It should be recalled that the spindle 214 is spring-biased in the direction of the arrow B. When the arm 272 is turned in the aforementioned manner, the roller 264 of the manual operating member 256 so far resting on the lower side 276 of the upper portion 274 of the arm 272 rides over the intermediate step, and shifts onto the elevated side 278 to continue to pressure the arm 272 counterclockwise. The forces of the springs 254 and 294, as well as the shape and position of the elevated side 278 and other dimensions, are so selected that the aforesaid pressuring force is greater than the repelling force of the spring 294, and so that the roller 264 is not returned in the direction opposite to the arrow B under the repelling force of the spring 294. In this manner, the cartridge 400 is held at the position shown in FIG. 4.

When the spindle 214 is moved in the direction of the arrow B, the end piece 216 is passed through the opening 408 of the cartridge 400 to be engaged with the opening 506 of the core 502. Since the tip 218 is in the form of a regular cone, such engagement may occur smoothly. When the rotary member 250 is turned manually, or in response to the motor 232 turning the spindle 214 in the direction of the arrow A, the lugs 220 at the tip 218 will be brought into engagement with the corresponding plurality of cut-outs 510 of the core 502, while the tip 218 advances into the opening 506 until its annular flange 222 rests on the edge of core 502. In this manner, the tip 218 is engaged appropriately with the opening 506 of the core 502.

The force applied to the core 502 by the end piece 216 during such engagement of the tip 218 with the core 502 is stably derived from the spring 254, whereas other unstable external forces derived from manual operation would not be applied to the core 502. In this manner, the film 504 and the core 502, which are intrinsically delicate, will be protected from damage occasionally caused by engagement with the end piece 216.

Referring to FIG. 5, flat plate 204 carries an arm 298 turnably about a shaft 296 secured thereto by fastening means, not shown. Arm 298 supports roller 600 on a shaft 604 at its free end. The roller 600 may roll freely about shaft 604 to be engageable with teeth 228 of the gear 224. The arm 298 is biased by a coil spring 602 to rotate clockwise in FIG. 5 about shaft 296. This induces clicking in rotation, i.e. an intermittent rotation of the gear 224.

More specifically in the present embodiment, since fifteen images may be formed on the film 504, the gear 224 has fifteen teeth 228 accordingly. Thus, the gear 224 may stop stepwise at fifteen positions, the roller 600 being positioned between two adjacent teeth 228 at each of these fifteen stop positions. In other words, the gear 214 takes fifteen stop positions in the direction of rotation about the spindle 214.

As shown in FIG. 6, the lower part of the cartridge holder 208 has a rectangular optical opening 606 corresponding in shape to the frame 512. Thus, when the motor 232 is driven in operation with the cartridge 400 loaded in the present device and the tip 218 of the spindle 214 engaged with the opening 506 of the core 502, the boss 248 of the cam 244 is brought into engagement with the gear 224 during a rotation of the cam 244, thus causing the gear 224 to rotate. This causes rotation of the spindle 214 about its own axis, and hence, associated rotation of the film 504 within the cartridge 400.

There is a phase difference between teeth of the gear 224 which are to be engaged with the boss 248 and the roller 800. In the present embodiment, both are out of phase by 180 angular degrees relative to each other. It should be noted that the gear 224 is driven by motor 232 only when the boss 248 is engaged with teeth 228. Therefore, when the boss 248 is disengaged from the gear 224, and the roller 600 abuts on and descends into the gap between the adjoining teeth 228, the gear 224 is brought to a stop thereat in stability under an external force supplied from the roller 600. In other words, the gear 224 is brought to a stop whenever each frame 512 is substantially in register with the opening 606. In this manner, selected one of the frames 512 will be brought into register with the opening 606, that is, into the projecting position.

Preferably, at this time, current supply to the electric motor 232 is interrupted, and/or an electrical braking may be applied to the motor 232, or alternatively a mechanical braking applied to the driving system of the cam 244. In this manner, the cam 244 will be stopped at a position in which the boss 248 is not engaged with gear 224, in order that the shifting from the state shown in FIG. 3 to the state shown in FIG. 4 may take place smoothly without abutment of the gear 224 on the boss 248.

Even in the state in FIG. 4, the gear 224 is not engaged with the boss 248, unless the motor 232 is in operation. Naturally in the state shown in FIG. 3, the gear 224 is not engaged with boss 248. Therefore, in these circumstances, the spindle 214, and hence the disk 500, can smoothly be rotated in response to the rotary member 250 turned manually. In other words, since the disk 500 is not mechanically associated with the driving system of the electric motor 232 in this situation, it can be turned at light load without operating on the heavy load, such as the driving mechanism of the motor 232. It should be noted that the intermittent rotation or clicking motion effected by the roller 600 and the teeth 228 is effective in this state so that each frame 512 can be stopped in correct alignment with the optical opening 606.

As shown in FIG. 4, a projection optical system 614 and a light source 616 are arranged on a central optical axis of the opening 606. Light source 616 may advantageously include an incandescent lamp of a higher color temperature for projection of color images. The light source 616 is attached to the flat plate 604 by attaching means, not shown. The optical system 614 is essentially comprised of a lens system for condensing the light from the light source 616, a light deflecting plate for scattering the condensed light, and a color temperature adjustment filter, all not shown. The latter is used for cancelling orange color caused from an orange mask which is commonly used on a color negative applicable to the film 504.

The opening 606, projection optical system 614 and light source 616 are thus aligned on optical axis 612. A frame 512 of the film 504 placed on the optical axis 612 is illuminated by the light source 616 through the projection optical system 614, so that the image of the frame 512 may be shot by television camera 100.

For taking out the cartridge 400, the boss 262 on the manual operating member 256 is manually pulled against the force of the spring 254 in the direction opposite to the arrow B, so that the spindle 214 is disengaged from the opening 408 of the cartridge 400. At this time, the roller 264 is moved from the elevated side 278 towards the lower side 276 on the upper portion 274 of the arm 272 contact being maintained with side 278 and then 276. At this time, the abutment member 282 is raised by spring 294 to eject the cartridge 400 out, the arm 272 being turned clockwise in FIG. 4. When the manual force is then released, the roller 264 is urged in the direction of the arrow B under the repelling force of the spring 254 to be engaged with the step on the lower portion 274. Since the arm 272 is not pressed down counterclockwise unless the abutment member 282 is acted on again, the cartridge 400 remains in the ejected position for subsequent exchange to another cartridge as desired.

From the foregoing it is seen that the cartridge 400 can be loaded by a simple operation of manually inserting it into the recess 212 of the cartridge holder 208, and can be ejected by a similarly simple operation of pulling the boss 262. These manual operations are effected easily with only one hand.

According to the disk film projector of the present invention, a disk cartridge can be loaded and unloaded by taking advantage of a stable mechanical force, such as of a spring, so that disk film loading and unloading operations may be greatly facilitated despite the simplified structure of the device. In addition, the risk of injuring the delicate structure of a disk film is minimized.

While the present invention has been described with reference to the particular illustrative embodiment, it is not to be restricted by the embodiment but only by the appended claims. It is to be appreciated that those engaged in the art can change or modify the embodiment without departing from the scope and spirit of the present invention.

What is claimed is:

1. A disk film projector wherein one of a plurality of frames of image recorded on a rotary disk of film having a central engaging part is selectively placed at a projecting position to reproduce selected one of said frames in the form of a visible images, comprising:
    driving means including a rotary driving shaft having a forward end thereof engageable with the engaging part of said disk of film;
    means for holding said rotary film in a plane substantially normal to said rotary driving shaft upon insertion of said rotary film thereinto, said rotary disk being introduced, and taken out of, the projector in a direction substantially normal to said rotary driving shaft;
    means for normally urging said rotary driving shaft in a direction such that said driving shaft is engaged with the engaging part of the rotary disk held by said holding means; and
    means for locking said rotary driving means at a position spaced from said rotary disk when said rotary driving shaft is, in response to manual operation thereon, shifted against said urging means and away from said rotary disk.

2. A disk film projector according to claim 1, wherein said rotary film is contained in a protective enclosure, said holding means including means responsive to said protective enclosure being inserted into an appropriate image projecting position for unlocking said locking means.

3. A disk film projector according to claim 1, wherein said driving means includes a rotary member for turning said rotary driving shaft in response to manual operation thereon,
    said rotary member regulating said rotary driving shaft to rotate regardless of a longitudinal shifting of said rotary driving shaft.

* * * * *